United States Patent
Hernandez et al.

(10) Patent No.: US 8,734,742 B2
(45) Date of Patent: May 27, 2014

(54) METHOD FOR TREATING A GAS CONTAINING NITROGEN OXIDES (NOX), IN WHICH A COMPOSITION COMPRISING CERIUM OXIDE AND NIOBIUM OXIDE IS USED AS A CATALYST

(75) Inventors: Julien Hernandez, Antony (FR); Emmanuel Rohart, Amiens (FR); Rui Jorge Coelho Marques, Paris (FR); Deborah Jayne Harris, Manchester (GB); Clare Jones, Liverpool (GB)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/877,154

(22) PCT Filed: Sep. 28, 2011

(86) PCT No.: PCT/EP2011/066908
§ 371 (c)(1),
(2), (4) Date: Mar. 29, 2013

(87) PCT Pub. No.: WO2012/041921
PCT Pub. Date: Apr. 5, 2012

(65) Prior Publication Data
US 2013/0195743 A1   Aug. 1, 2013

(30) Foreign Application Priority Data
Sep. 29, 2010 (FR) ..................... 10 03861

(51) Int. Cl.
*B01D 53/56* (2006.01)
*B01D 53/94* (2006.01)

(52) U.S. Cl.
USPC .......... 423/213.2; 423/239.1; 60/299; 60/301

(58) Field of Classification Search
USPC ...................... 423/213.2, 239.1; 60/299, 301
See application file for complete search history.

(56) References Cited

U.S. PATENT DOCUMENTS

| | | | |
|---|---|---|---|
| 4,663,137 A | 5/1987 | Chane-Ching et al. | |
| 4,940,685 A | 7/1990 | Sauvion et al. | |
| 5,011,671 A | 4/1991 | Le Loarer | |
| 5,529,969 A | 6/1996 | Bonneau et al. | |
| 5,712,218 A | 1/1998 | Chopin et al. | |
| 5,908,800 A | 6/1999 | Bonneau et al. | |
| 5,928,619 A | 7/1999 | Bonneau et al. | |
| 6,228,799 B1 | 5/2001 | Aubert et al. | |
| 2007/0189955 A1 | 8/2007 | Larcher et al. | |
| 2009/0274599 A1 | 11/2009 | Larcher et al. | |
| 2009/0304566 A1 | 12/2009 | Golden et al. | |
| 2013/0121902 A1* | 5/2013 | Adelmann et al. ......... | 423/213.5 |
| 2013/0189172 A1* | 7/2013 | Spurk et al. ............... | 423/213.2 |

FOREIGN PATENT DOCUMENTS

| | | |
|---|---|---|
| EP | 0 153 227 A1 | 8/1985 |
| EP | 0 207 857 A2 | 1/1987 |
| EP | 0 300 852 A1 | 1/1989 |
| EP | 0 388 567 A1 | 9/1990 |
| EP | 0 547 924 A1 | 6/1993 |
| EP | 0 588 691 A1 | 3/1994 |
| EP | 0 605 274 A1 | 7/1994 |
| EP | 0 735 984 B1 | 3/1998 |
| EP | 2 368 628 A1 | 9/2011 |
| FR | 2 852 592 A1 | 9/2004 |
| FR | 2 859 470 A1 | 3/2005 |
| JP | 2004-351371 A | 12/2004 |
| WO | 2007/093593 A1 | 8/2007 |
| WO | 2008/051752 A2 | 5/2008 |
| WO | 2008/156219 A1 | 12/2008 |

OTHER PUBLICATIONS

Casapu et al., "Characterization of Nb-Containing MnOx—CeO2 Catalyst for Low-Temperature Selective Catalytic Reduction of NO with NH3," J. Phys. Chem., 2010, pp. 9791-9801, vol. 114.
Nolan, "Formation of Ce3+ at the cerium dioxide (110) surface by doping," Chemical Physics Letters, 2010, pp. 115-118, vol. 492.
International Search Report issued on Sep. 29, 2010, by the European Patent Office as the International Searching Authority in International Patent Application No. PCT/EP2011/066908.

* cited by examiner

*Primary Examiner* — Timothy Vanoy
(74) *Attorney, Agent, or Firm* — Dentons US LLP

(57) ABSTRACT

A method is described for treating a gas including nitrogen oxides ($NO_x$). The method can include conducting a reduction reaction of the nitrogen oxides with a nitrogen reducing agent. Further described, is a catalyst used for the reduction reaction which is a catalytic system including a composition based on cerium oxide and including niobium oxide in a proportion by a mass of from 2% to 20%.

20 Claims, No Drawings

METHOD FOR TREATING A GAS CONTAINING NITROGEN OXIDES (NOX), IN WHICH A COMPOSITION COMPRISING CERIUM OXIDE AND NIOBIUM OXIDE IS USED AS A CATALYST

CROSS-REFERENCE TO PRIOR APPLICATIONS

This application is a National Stage of PCT/EP2011/066908, filed Sep. 28, 2011, and designating the United States (published in French on Apr. 5, 2012, as WO 2012/041921 A1), which claims priority under 35 U.S.C. §119 to FR 1003861, filed Sep. 29, 2010, each hereby expressly incorporated by reference in its entirety and each assigned to the assignee hereof.

The present invention relates to a process for treating a gas containing nitrogen oxides (NOx) using a composition based on cerium oxide and niobium oxide as catalyst.

It is known that motor vehicle engines emit gases containing nitrogen oxides (NOx) that are harmful to the environment. It is thus necessary to treat these oxides in order to convert them into nitrogen.

One known method for this treatment is the SCR process in which the reduction of NOx is performed with ammonia or an ammonia precursor such as urea.

The SCR process allows effective treatment of the gases, but its efficacy at low temperature remains to be improved. Thus, the catalytic systems currently used for performing this process are often efficient only for temperatures above 250° C. It would thus be advantageous to have catalysts that have significant activity at temperatures of 250° C. or less.

Finally, catalysts whose resistance to ageing is improved are also sought.

The object of the invention is thus to provide catalysts that are more efficient for SCR catalysis.

With this aim, the process of the invention is a process for treating a gas containing nitrogen oxides (NOx) in which a reaction for reduction of the NOx with a nitrogenous reducing agent is performed, and is characterized in that a catalytic system containing a composition based on cerium oxide and which comprises niobium oxide, with the following mass proportions:

niobium oxide from 2% to 20%;
the remainder being cerium oxide,
is used as catalyst for this reduction reaction.

Other characteristics, details and advantages of the invention will emerge even more fully on reading the description that follows, and also the various concrete but non-limiting examples intended to illustrate it.

For the present description, the term "rare-earth metal" means the elements from the group consisting of yttrium and the elements of the Periodic Table with atomic numbers of between 57 and 71 inclusive.

The term "specific surface area" means the BET specific surface area determined by adsorption of nitrogen in accordance with standard ASTM D 3663-78 established from the Brunauer-Emmett-Teller method described in "The Journal of the American Society, 60, 309 (1938)".

The specific surface area values that are indicated for a given temperature and time correspond, unless otherwise indicated, to calcinations in air over a stage at this temperature and for the indicated time.

The calcinations mentioned in the description are calcinations in air unless otherwise indicated. The calcination time that is indicated for a temperature corresponds to the duration of the steady stage at this temperature.

The contents or proportions are given by mass and as oxide (especially $CeO_2$, $Ln_2O_3$, Ln denoting a trivalent rare-earth metal, $Pr_5O_{11}$ in the particular case of praseodymium, $Nb_2O_5$ in the case of niobium), unless otherwise mentioned.

It is also pointed out for the rest of the description that, unless otherwise mentioned, in the ranges of values that are given, the limit values are included.

The composition of the catalytic system of the invention is first characterized by the nature and proportions of its constituents. Thus, and according to a first embodiment, it is based on cerium and niobium, these elements being present in the composition generally in the form of oxides. These elements are moreover present in the specific proportions that have been given above.

The cerium oxide of the composition may be stabilized. The term "stabilized" means herein stabilization of the specific surface area, with at least one rare-earth metal other than cerium, in oxide form. This rare-earth metal may more particularly be yttrium, neodymium, lanthanum or praseodymium. The content of stabilizing rare-earth metal oxide is generally not more than 20%, preferably when the rare-earth metal is lanthanum, more particularly not more than 15% and preferably not more than 10% by mass. The minimum content of stabilizing rare-earth metal oxide is that at and above which the stabilizing effect is experienced, and it is generally at least 1% and more particularly at least 2%. This content is expressed as rare-earth metal oxide relative to the mass of the combined cerium oxide-stabilizing rare-earth metal oxide.

The cerium oxide may also be stabilized, the stabilization still being in the sense of the specific surface area, with an oxide chosen from silica, alumina and titanium oxide. The content of this stabilizing oxide may be not more than 10% and particularly not more than 5%. The minimum content may be at least 1%. This content is expressed as stabilizing oxide relative to the mass of the combined cerium oxide-stabilizing oxide.

According to a second embodiment of the invention, the composition of the catalytic system of the invention comprises three constituent elements, which are also in the form of oxides, namely cerium, niobium and zirconium.

The respective proportions of these elements are then as follows:

cerium oxide: at least 50%;
niobium oxide: from 2% to 20%;
zirconium oxide: up to 48%.

The minimum proportion of zirconium oxide in the case of this second embodiment of the invention is preferably at least 10% and more particularly at least 15%. The maximum content of zirconium oxide may more particularly be not more than 40% and more particularly not more than 30%.

According to a third embodiment of the invention, the composition of the catalytic system of the invention also contains at least one oxide of an element M chosen from the group comprising tungsten, molybdenum, iron, copper, silicon, aluminium, manganese, titanium, vanadium and rare-earth metals other than cerium, with the following mass proportions:

cerium oxide: at least 50%;
niobium oxide: from 2% to 20%;
oxide of the element M: up to 20%;
the remainder being zirconium oxide.

This element M may especially act as a stabilizer for the surface of the mixed oxide of cerium and of zirconium, or else may improve the reducibility of the composition. For the remainder of the description, it should be understood that although, for the sake of simplicity, only one element M is mentioned, it is clearly understood that the invention applies to the case where the compositions comprise several elements M.

The maximum proportion of oxide of the element M in the case of rare-earth metals and tungsten may more particularly be not more than 15% and even more particularly not more than 10% by mass of oxide of the element M (rare-earth metal and/or tungsten). The minimum content is at least 1% and more particularly at least 2%, the contents given above being expressed relative to the combined cerium oxide-zirconium oxide-oxide of the element M.

In the case where M is neither a rare-earth metal nor tungsten, the content of oxide of the element M may more particularly be not more than 10% and even more particularly not more than 5%. The minimum content may be at least 1%. This content is expressed as oxide of the element M relative to the combined cerium oxide-zirconium oxide and oxide of the element M.

In the case of the rare-earth metals, the element M may more particularly be yttrium, lanthanum, praseodymium and neodymium.

For the various embodiments described above, the proportion of niobium oxide may more particularly be between 3% and 15% and even more particularly between 5% and 10%.

In the case of the compositions according to the second or third embodiment and according to an advantageous variant, the cerium content may be at least 65%, more particularly at least 70% and even more particularly at least 75%, and the niobium content may be between 2% and 12% and more particularly between 2% and 10%. The compositions according to this variant have high acidity and reducibility.

In the case of the compositions according to the second or third embodiment and according to another advantageous variant, the cerium oxide content may be at least 60% and more particularly at least 65%, and the zirconium oxide content may be in a mass proportion of not more than 25%, and more particularly between 15% and 25%.

Still for these various embodiments, the proportion of niobium may even more particularly be less than 10%, for example within a minimum value that may be 2%, 4% or 5% and a maximum value of strictly less than 10%, for example not more than 9%, more particularly not more than 8% and even more particularly not more than 7%. This niobium content is expressed as mass of niobium oxide relative to the mass of the composition as a whole. The values for the proportions of niobium that have just been given, especially that strictly less than 10%, apply to the advantageous variants according to the second or third embodiments that have been described previously.

According to one variant of the invention, the compositions of the invention according to the first embodiment, i.e. the compositions based on cerium oxide and niobium oxide, and those according to the second embodiment may also comprise oxides of at least one metal M' chosen from the group comprising vanadium, copper, manganese, tungsten and iron in a proportion that may be between 1% and 10%, more particularly between 1% and 5% and more preferentially between 1% and 3%, this proportion being expressed as weight of oxide of the metal relative to the composition as a whole. These compositions according to this variant may have improved catalytic activity.

The compositions of the catalytic system of the invention finally have a specific surface area that is sufficiently stable, i.e. sufficiently high at high temperature, for them to be usable in the field of catalysis.

Thus, generally, the compositions according to the first embodiment have a specific surface area after calcination for 4 hours at 800° C. that is at least 15 m²/g. For the compositions according to the second and third embodiments, this surface area, under the same conditions, is generally at least 20 m²/g. For the third embodiments, the compositions of the catalytic system of the invention may have a surface area ranging up to about 55 m²/g, still under the same calcination conditions.

The compositions of the catalytic system of the invention, in the case where they contain an amount of niobium of at least 10%, and according to one advantageous embodiment, may have a specific surface area after calcination for 4 hours at 800° C. that is at least 35 m²/g and more particularly at least 40 m²/g.

Still for the three embodiments, the compositions of the catalytic system of the invention may have a surface area after calcination at 900° C. for 4 hours that is at least 10 m²/g. Under the same calcination conditions, they may have specific surface areas ranging up to about 30 m²/g.

The compositions of the catalytic system of the invention have high acidity, which may be measured via a TPD analysis method, which will be described later, and which is at least $5 \times 10^{-2}$, more particularly at least $6 \times 10^{-2}$ and even more particularly at least $7 \times 10^{-2}$, this acidity being expressed as ml of ammonia (at STP: standard temperature and pressure) per m² (BET measurement) of product. The surface area taken into account here is the value expressed in m² of the specific surface area of the product after calcination at 800° C. for 4 hours. Acidities of at least about $9.5 \times 10^{-2}$ may be obtained.

The compositions of the catalytic system of the invention also have high reducibility properties. These properties may be measured by the temperature-programmed reduction (TPR) measurement method that will be described later. The compositions of the catalytic system of the invention have a reducibility of at least 15, this reducibility being expressed in ml of hydrogen (at STP) per g of product.

The compositions may be in the form of a solid solution of oxides of niobium, of the stabilizing element in the case of the first embodiment, of zirconium and of the element M or M' in the cerium oxide for the other embodiments. The presence of a single phase on X-ray diffraction corresponding to the cubic phase of cerium oxide is then observed in this case. In general, the stability of this solid solution is such that its presence may be observed on compositions which may have undergone calcinations up to temperatures of 900° C., for 4 hours.

The invention also relates to the case where the compositions consist essentially of oxides of the abovementioned elements, cerium, niobium and, where appropriate, zirconium and the element M or M'. The term "consists essentially of" means that the composition under consideration contains only the oxides of the abovementioned elements and that it does not contain any oxide of another functional element, i.e. of an element liable to have a positive influence on the reducibility and/or the acidity and/or the stability of the composition. On the other hand, the composition may contain elements such as impurities that may especially originate from its preparation process, for example from the starting materials or reagents used.

The compositions of the catalytic system of the invention may be prepared via the known impregnation process. Thus, a cerium oxide or a mixed oxide of cerium and zirconium prepared beforehand is impregnated with a solution comprising a niobium compound, for example an oxalate or an oxalate of niobium and ammonium. In the case of the preparation of a composition that also comprises an oxide of the element M or M', a solution that contains a compound of this element M or M' in addition to the niobium compound is used for the impregnation. The element M or M' may also be present in the starting cerium oxide that is impregnated.

Dry impregnation is more particularly used. Dry impregnation consists in adding to the product to be impregnated a volume of an aqueous solution of the impregnating element that is equal to the pore volume of the solid to be impregnated.

The cerium oxide or the mixed oxide of cerium and zirconium should have specific surface area properties that make it suitable for use in catalysis. Thus, this surface area should be stable, i.e. it should have a sufficient value for such a use even at high temperature.

Such oxides are well known. For cerium oxides, it is especially possible to use those described in patent applications EP 0 153 227, EP 0 388 567 and EP 0 300 852. For the cerium oxides stabilized with an element such as rare-earth metals, silicon, aluminium and iron, the products described in EP 2 160 357, EP 547 924, EP 588 691 and EP 207 857 may be used. For the mixed oxides of cerium and zirconium optionally with an element M, especially in the case where M is a rare-earth metal, products that are suitable for the present invention which may be mentioned include those described in patent applications EP 605 274, EP 1 991 354, EP 1 660 406, EP 1 603 657, EP 0 906 244 and EP 0 735 984. For the implementation of the present invention, reference may thus be made, if necessary, to all of the description of the patent applications mentioned above.

The compositions of the catalytic system of the invention may thus be prepared via a second process that will be described below.

This process comprises the following steps:
(a1)) a suspension of a niobium hydroxide is mixed with a solution comprising salts of cerium and, where appropriate, of zirconium and of the element M;
(b1) the mixture thus formed is placed in contact with a basic compound, via which a precipitate is obtained;
(c1) the precipitate is separated from the reaction medium and is calcined.

The first step of this process uses a suspension of a niobium hydroxide. This suspension may be obtained by reacting a niobium salt, such as a chloride, with a base, such as aqueous ammonia, to obtain a niobium hydroxide precipitate. This suspension may also be obtained by reaction of a niobium salt such as potassium or sodium niobiate with an acid such as nitric acid to obtain a niobium hydroxide precipitate.

This reaction may be performed in a mixture of water and an alcohol such as ethanol. The hydroxide thus obtained is washed by any known means and is then resuspended in water in the presence of a peptizer such as nitric acid.

The second step (b1) of the process consists in mixing the niobium hydroxide suspension with a solution of a cerium salt. This solution may also contain a zirconium salt and also a salt of the element M or M' in the case of the preparation of a composition that also comprises a zirconium oxide or the oxide of this element M or M'. These salts may be chosen from nitrates, sulfates, acetates, chlorides and ammonium cerium nitrate.

Examples of zirconium salts that may thus be mentioned include zirconium sulfate, zirconyl nitrate or zirconyl chloride. Zirconyl nitrate is most generally used.

When a salt of cerium in III form is used, it is preferable to introduce into the salt solution an oxidizing agent, for example hydrogen peroxide.

The various salts of the solution are present in the stoichiometric proportions necessary to obtain the desired final composition.

The mixture formed from the niobium hydroxide suspension and the solution of the salts of the other elements is placed in contact with a basic compound.

Products of hydroxide type may be used as base or basic compound. Mention may be made of alkali metal or alkaline-earth metal hydroxides. Secondary, tertiary or quaternary amines may also be used. However, amines and aqueous ammonia may be preferred since they reduce the risks of pollution by the alkali metal or alkaline-earth metal cations. Mention may also be made of urea. The basic compound may be used more particularly in the form of a solution.

The reaction between the abovementioned mixture and the basic compound is preferably performed continuously in a reactor. This reaction thus takes place by continuously introducing the mixture and the basic compound and by also continuously withdrawing the reaction product.

The precipitate that is obtained is separated from the reaction medium via any standard technique of solid-liquid separation, for instance filtration, decantation, draining or centrifugation. This precipitate may be washed and then calcined at a temperature sufficient to form the oxides, for example of at least 500° C.

The compositions of the catalytic system of the invention may also be prepared via a third process that includes the following steps:
(a2) in a first step, a mixture is prepared in liquid medium containing a cerium compound and, where appropriate, a compound of zirconium and of the element M or M' for the preparation of compositions that contain zirconium oxide and/or an oxide of the element M or M';
(b2) the said mixture is placed in contact with a basic compound, via which a suspension containing a precipitate is obtained;
(c2) this suspension is mixed with a solution of a niobium salt;
(d2) the solid is separated from the liquid medium;
(e2) the said solid is calcined.

The cerium compound may be a compound of cerium III or of cerium IV. The compounds are preferably soluble compounds such as salts. Everything that has been stated hereinabove for the salts of cerium, of zirconium and of the element M or M' also applies here. This is likewise the case for the nature of the basic compound. The various compounds of the starting mixture of the first step are present in the stoichiometric proportions necessary to obtain the desired final composition.

The liquid medium of the first step is generally water.

The starting mixture of the first step may be obtained from compounds that are initially in solid form and that will be introduced thereafter into a feedstock of water, for example, or alternatively directly from solutions of these compounds followed by mixing, in any order, of the said solutions.

The order of introduction of the reagents in the second step (b2) is unimportant, the basic compound possibly being introduced into the mixture, or, conversely, the reagents possibly being introduced simultaneously into the reactor.

The addition may be performed all at once, gradually or continuously, and is preferably performed with stirring. This operation may be performed at a temperature between room temperature (18-25° C.) and the reflux temperature of the reaction medium, the latter temperature possibly being up to 120° C., for example. It is preferably performed at room temperature.

As in the case of the first process, it may be noted that it is possible, especially in the case of using a cerium III compound, to add an oxidizing agent such as hydrogen peroxide either to the starting mixture or during the introduction of the basic compound.

At the end of the second step (b2) of addition of the basic compound, the reaction medium may optionally be kept stirring for a certain time, in order to complete the precipitation.

It is also possible, at this stage of the process, to perform maturation. This may be performed directly on the reaction medium obtained after the placing in contact with the basic compound or on a suspension obtained after resuspending the precipitate in water. Maturation is performed by heating the medium. The temperature to which the medium is heated is at least 40° C., more particularly at least 60° C. and even more particularly at least 100° C. The medium is thus maintained at a constant temperature for a time usually of at least 30 minutes and more particularly of at least 1 hour. The maturation may be performed at atmospheric pressure or optionally at a higher pressure and at a temperature above 100° C. and especially between 100° C. and 150° C.

The following step (c2) of the process consists in mixing the suspension obtained after the preceding step with a solution of a niobium salt. Niobium salts that may be mentioned include niobium chloride, potassium niobiate or sodium niobiate and most particularly herein niobium oxalate and niobium ammonium oxalate.

This mixing is preferably performed at room temperature.

The following steps (d2) and (e2) of the process consist in separating the solid from the suspension obtained in the preceding step, in optionally washing this solid and then in calcining it. These steps proceed in an identical manner to that described above for the second process.

In the case of the preparation of compositions that contain the oxide of the element M or M', the third process may include a variant in which the compound of this element M or M' is not present in step (a2). The compound of the element M or M' is then introduced into step (c2) either before or after mixing with the niobium solution or alternatively at the same time.

Finally, the compositions of the catalytic system of the invention that are based on oxides of cerium, of niobium and of zirconium and optionally of an oxide of the element M may also be prepared via a fourth process that will be described below.

This process includes the following steps:
(a3) a mixture is prepared in a liquid medium containing a zirconium compound and a cerium compound and, where appropriate, a compound of the element M;
(b3) the said mixture is heated to a temperature above 100° C.;
(c3) the reaction mixture obtained after the heating is brought to a basic pH;
(c'3) maturation of the reaction medium is optionally performed;
(d3) this medium is mixed with a solution of a niobium salt;
(e3) the solid is separated from the liquid medium;
(f3) the said solid is calcined.

The first step of the process consists in preparing a mixture in liquid medium of a zirconium compound and of a cerium compound and, where appropriate, a compound of the element M. The various compounds of the mixture are present in the stoichiometric proportions required to obtain the desired final composition.

The liquid medium is generally water.

The compounds are preferably soluble compounds. They may especially be salts of zirconium, of cerium and of the element M as described above.

The mixture may be obtained either from compounds that are initially in solid form and that will be introduced thereafter into a feedstock of water, for example, or alternatively directly from solutions of these compounds followed by mixing, in any order, of the said solutions.

Once the initial mixture is thus obtained, it is then heated, in accordance with the second step (b3) of this fourth process.

The temperature at which this heat treatment, also known as thermal hydrolysis, is conducted is greater than 100° C. It may thus be between 100° C. and the critical temperature of the reaction medium, in particular between 100° C. and 350° C. and preferably between 100 and 200° C.

The heating operation may be performed by introducing the liquid medium into a closed container (closed reactor of the autoclave type), the necessary pressure then resulting solely from heating the reaction medium (autogenous pressure). Under the temperature conditions given above, and in aqueous media, it may thus be stated, by way of illustration, that the pressure in the closed reactor may range between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). Needless to say, it is also possible to exert an external pressure which then adds to that consecutive to the heating.

The heating may also be performed in an open reactor for temperatures in the region of 100° C.

The heating may be performed either in air or in an atmosphere of an inert gas, preferably nitrogen.

The duration of the treatment is not critical, and may thus vary within a wide range, for example between 1 and 48 hours and preferably between 2 and 24 hours. Similarly, the temperature rise takes place at a rate that is not critical, and the set reaction temperature may thus be reached by heating the medium for between 30 minutes and 4 hours, for example, these values being given purely as a guide.

After this second step, the reaction medium thus obtained is brought to a basic pH. This operation is performed by adding to the medium a base, for instance an aqueous ammonia solution.

The term "basic pH" means a pH value of greater than 7 and preferably greater than 8.

Although this variant is not preferred, it is possible to introduce into the reaction mixture obtained after the heating, especially at the time of addition of the base, the element M especially in the form that has been described above.

After the heating step, a solid precipitate is recovered, and may be separated from its medium as described previously.

The product as recovered may then be subjected to washes, which are then performed with water or optionally with a basic solution, for example an aqueous ammonia solution. The washing may be performed by resuspending the precipitate in water and maintaining the suspension thus obtained at a temperature that may be up to 100° C. To remove the residual water, the washed product may optionally be dried, for example in an oven or by spraying, at a temperature that may range between 80 and 300° C. and preferably between 100 and 200° C.

According to one particular variant of the invention, the process includes maturation (step c'3).

The maturation is performed under the same conditions as those that have been described above for the third process.

The maturation may also be performed on a suspension obtained after resuspending the precipitate in water. The pH of this suspension may be adjusted to a value of greater than 7 and preferably greater than 8.

It is possible to perform several maturations. Thus, the precipitate obtained after the maturation step and optional washing may be resuspended in water, followed by another maturation of the medium thus obtained. This other maturation is performed under the same conditions as those that have been described for the first. Needless to say, this operation may be repeated several times.

The following steps of this fourth process (d3) to (f3), i.e. the mixing with the niobium salt solution, the solid/liquid separation and the calcination, are performed in the same manner as for the corresponding steps of the second and third process. Everything that has been described hereinabove for these steps thus applies here.

The catalytic system used in the process of the invention contains a composition as described previously, this composition generally being mixed with a material usually used in the field of catalyst formulation, i.e. a material chosen from thermally inert materials. This material may thus be chosen from alumina, titanium oxide, cerium oxide, zirconium oxide, silica, spinels, zeolites, silicates, crystalline aluminium silicon phosphates and crystalline aluminium phosphates.

The proportions between the composition and the inert material are those usually used in the technical field under consideration herein and are well known to those skilled in the art. By way of example, these proportions may be between 2% and 20% and more particularly between 2% and 10%, expressed as mass of inert material relative to the total amount of inert material and composition.

Generally, the catalytic system used in the process of the invention may be formed by the abovementioned mixture deposited on a substrate. More specifically, the mixture of the composition and of the thermally inert material constitutes a wash coat with catalytic properties, and this wash coat is deposited on a substrate of metallic monolith type, for example iron-chromium alloy, or of ceramic, for example made of cordierite, silicon carbide, alumina titanate or mullite.

This wash coat is obtained by mixing the composition with the thermally inert material so as to form a suspension that can then be deposited on the substrate.

According to another embodiment, the catalytic system used in the process of the invention may be based on the composition as described previously, this composition being used in an extruded form. It may thus be in the form of a monolith of honeycomb structure or in the form of a monolith of particle filter type (partly closed channels). In these two cases, the composition of the invention may be mixed with additives of known type to facilitate the extrusion and to ensure the mechanical strength of the extrudate. Such additives may be chosen especially from silica, alumina, clays, silicates, titanium sulfate, ceramic fibres, especially in proportions generally used, i.e. up to about 30% by mass relative to the composition as a whole.

The invention also relates to a catalytic system that contains a zeolite in addition to the composition based on cerium and niobium oxides.

The zeolite may be natural or synthetic and it may be of the aluminosilicate, aluminophosphate or silicoaluminophosphate type.

A zeolite that has undergone a treatment so as to improve its hydrothermal stability is preferably used. Examples of treatments of this type that may be mentioned include (i) dealumination by treatment with steam and acidic extraction using an acid or a complexing agent (for example EDTA—ethylenediaminetetraacetic acid); by treatment with an acid and/or a complexing agent; by treatment with a gaseous stream of $SiCl_4$; (ii) cationic exchange by using multivalent cations such as La; and (iii) the use of phosphorus-containing compounds.

According to another particular embodiment of the invention and in the case of a zeolite of aluminosilicate type, this zeolite may have an Si/Al atomic ratio of at least 10 and more particularly of at least 20.

According to a more particular embodiment of the invention, the zeolite comprises at least another element chosen from the group comprising iron, copper and cerium.

The term "zeolite comprising at least another element" means a zeolite in whose structure have been added one or more metals of the abovementioned type by ion exchange, impregnation or isomorphic substitution.

In this embodiment, the metal content may be between about 1% and about 5%, this content being expressed as mass of metal element relative to the zeolite.

Mention may be made more particularly, as zeolites of the aluminosilicate type that may be included in the constitution of the composition of the catalytic system of the invention, of those chosen from the group comprising the beta, gamma zeolites ZSM 5 and ZSM 34. For the zeolites of aluminophosphate type, mention may be made of those of the type such as SAPO-17, SAPO-18, SAPO-34, SAPO-35, SAPO-39, SAPO-43 and SAPO-56.

In the catalytic system of the invention, the mass percentage of zeolite relative to the total mass of the composition may range from 10% to 70%, more preferentially from 20% to 60% and even more preferentially from 30% to 50%.

For the implementation of this variant with zeolite of the catalytic system, simple physical mixing of the composition based on cerium and niobium oxides and of the zeolite may be performed.

The gas treatment process of the invention is a process of SCR type whose implementation is well known to those skilled in the art.

It may be recalled that this process uses as NOx reducing agent a nitrogenous reducing agent that may be ammonia, hydrazine or any suitable ammonia precursor, such as ammonium carbonate, urea, ammonium carbamate, ammonium hydrogen carbonate, ammonium formate or organometallic compounds containing ammonia. Ammonia or urea may more particularly be chosen.

Several chemical reactions may be performed in the SCR process for the reduction of NOx into elemental nitrogen. Only a few of the reactions liable to take place are given hereinbelow and by way of example, ammonia being the reducing agent.

A first reaction may be represented by equation (1)

$$4NO+4NH_3+O_2 \rightarrow 4N_2+6H_2O \tag{1}$$

Mention may also be made of the reaction of $NO_2$ present in the NOx with $NH_3$ according to equation (2)

$$3NO_2+4NH_3 \rightarrow (7/2)N_2+6H_2O \tag{2}$$

Furthermore, the reaction between $NH_3$ and NO and $NO_2$ may be represented by equation (3)

$$NO+NO_2+2NH_3 \rightarrow 2N_2+3H_2O \tag{3}$$

The process may be performed for the treatment of a gas originating from an internal combustion engine (mobile or stationary) especially of a motor vehicle engine, or of gas originating from a gas turbine, from coal-fired or fuel-fired power stations or from any other industrial installation.

According to one particular embodiment, the process is used for treating the exhaust gas of a lean-burn internal combustion engine or a diesel engine.

The process may also be performed using, besides the composition of the invention, another catalyst that is a catalyst for the oxidation of the nitrogen monoxide of the gas into nitrogen dioxide. In such a case, the process is used in a system in which the oxidation catalyst is arranged upstream of the point of injection of the nitrogenous reducing agent into the exhaust gas.

This oxidation catalyst may comprise at least one metal from the platinum group, for instance platinum, palladium or rhodium, on a support of the type such as alumina, cerin, zirconia or titanium oxide, for example, the catalyst/support assembly being included in a wash coat on a substrate especially of monolith type.

According to one advantageous variant of the invention and in the case of an exhaust circuit equipped with a particle filter intended to stop carbon-based particles or soots generated by the combustion of various combustibles, it is possible to perform the gas treatment process of the invention by arranging the catalytic system that has been described above on this filter, for example in the form of a wash coat arranged on the walls of the filter. It is observed that the use of the compositions of the invention according to this variant also makes it possible to reduce the temperature at and above which the combustion of the particles starts.

Examples will now be given.

Examples 1 to 14 that follow concern the synthesis of compositions that are used in the process of the invention.

EXAMPLE 1

This example concerns the preparation of a composition comprising cerium oxide, zirconium oxide and niobium oxide in the following respective mass proportions: 64%-26%-10%.

A niobium hydroxide suspension is first prepared according to the following process.

1200 g of anhydrous ethanol are introduced into a 5-liter reactor equipped with a stirrer and a condenser. 295 g of niobium (V) chloride powder are added over 20 minutes with stirring. 625 g of anhydrous ethanol are then added. The medium is left to stand for 12 hours.

50 g of deionized water are introduced into the reactor and the medium is refluxed at 70° C. for 1 hour. It is left to cool. This solution is named A.

870 g of an aqueous ammonia solution (29.8% $NH_3$) are placed in a 6-liter reactor equipped with a stirrer. All of solution A and 2250 ml of deionized water are simultaneously introduced over 15 minutes with stirring. The suspension is recovered and washed several times by centrifugation. The centrifuged material is named B.

2.4 liters of a 1 mol/l nitric acid solution are introduced into a 6-liter reactor equipped with a stirrer. The centrifuged material B is introduced into the reactor with stirring. Stirring is continued for 12 hours. The pH is 0.7. The concentration is 4.08% $Nb_2O_5$. This suspension is named C.

An aqueous ammonia solution D is then prepared by introducing 1040 g of a concentrated aqueous ammonia solution (D1) (29.8% $NH_3$) into 6690 g of deionized water (D2).

A solution E is prepared by mixing 4250 g of deionized water (E1), 1640 g of a cerium (III) nitrate solution (E2) (30.32% $CeO_2$), 1065 g of a zirconium oxynitrate solution (E3) (20.04% $ZrO_2$), 195 g of an aqueous hydrogen peroxide solution (E4) (50.30% $H_2O_2$) and 1935 g of suspension C (4.08% $Nb_2O_5$). This solution E is stirred.

Solution D and solution E are simultaneously added at a rate of 3.2 liters/hour into a stirred 4-liter reactor equipped with an overflow. After establishing the regime in the installation, the precipitate is recovered in a vat. The pH is stable and in the region of 9.

The suspension is filtered and the solid product obtained is washed and calcined at 800° C. for 4 hours.

EXAMPLES 2 TO 6

The preparation of the compositions of these examples is performed in the same manner as in Example 1. Solutions D and E are prepared with the same compounds, but with different proportions.

Table 1 below gives the precise preparation conditions.

TABLE 1

| Example No. Ce/Zr/Nb | Solution D | | Solution E | | | | |
|---|---|---|---|---|---|---|---|
| | D1 (in g) | D2 (in g) | E1 (in g) | E2 (in g) | E3 (in g) | E4 (in g) | C (in g) |
| No. 2 55/40/5 | 978 | 6760 | 5000 | 1440 | 1580 | 172 | 950 |
| No. 3 54/39/7 | 1024 | 6710 | 4580 | 1440 | 1580 | 172 | 1370 |
| No. 4 78/19/3 | 966 | 6670 | 5620 | 2035 | 770 | 242 | 505 |
| No. 5 77/19/4 | 1002 | 6730 | 5290 | 2035 | 770 | 242 | 830 |
| No. 6 79/19/7 | 1068 | 6650 | 4660 | 2035 | 770 | 242 | 1470 |

Meaning of the abbreviations of the table:

in the "Example" column for each example the numbers given below the example number correspond to the respective mass proportions of cerium, zirconium and niobium oxides for the composition of the example concerned;

D1: amount of concentrated aqueous ammonia solution (29.8% $NH_3$) used in the preparation of the aqueous ammonia solution D;

D2: amount of deionized water used in the preparation of the aqueous ammonia solution D;

E1: amount of deionized water used in the preparation of solution E;

E2: amount of cerium (III) nitrate solution (30.32% $CeO_2$) used in the preparation of solution E;

E3: amount of zirconium oxynitrate solution (20.04% $ZrO_2$) used in the preparation of solution E;

E4: amount of aqueous hydrogen peroxide solution (50.30% $H_2O_2$) used in the preparation of solution E;

C: amount of suspension C (4.08% $Nb_2O_5$) used in the preparation of solution E.

EXAMPLE 7

This example concerns the preparation of a composition comprising cerium oxide, zirconium oxide and niobium oxide in the following respective mass proportions: 72%-18%-10%.

A niobium (V) ammonium oxalate solution is prepared by hot dissolution of 192 g of niobium (V) ammonium oxalate in 300 g of deionized water. This solution is maintained at 50° C. The concentration of this solution is 14.2% $Nb_2O_5$. This solution is then introduced into a powder of a mixed oxide of cerium and zirconium (80/20 $CeO_2/ZrO_2$ mass composition, specific surface area after calcination at 800° C. for 4 hours of 59 $m^2/g$) to the point of saturation of the pore volume.

The impregnated powder is then calcined at 800° C. (steady stage of 4 hours).

EXAMPLES 8 TO 10

The preparation of the compositions of these examples is performed in the same manner as in Example 1. Solutions D and E are prepared with the same compounds but with different proportions.

Table 2 below gives the precise preparation conditions.

TABLE 2

| Example | Solution D | | Solution E | | | | |
|---|---|---|---|---|---|---|---|
| No. Ce/Zr/Nb | D1 (in g) | D2 (in g) | E1 (in g) | E2 (in g) | E3 (in g) | E4 (in g) | C (in g) |
| No. 8 69/17/14 | 1148 | 6570 | 3400 | 1880 | 710 | 224 | 2870 |
| No. 9 97/0/3 | 990 | 6750 | 5710 | 2540 | 0 | 298 | 625 |
| No. 10 91/0/9 | 1110 | 6610 | 4570 | 2540 | 0 | 298 | 1775 |

The abbreviations have the same meaning as in Table 1.

EXAMPLE 11

This example relates to the preparation of a composition comprising cerium oxide, zirconium oxide and niobium oxide in the following respective mass proportions: 63%-27%-10%.

A solution of zirconium and cerium IV nitrates is prepared by mixing 264 g of deionized water, 238 g of cerium (IV) nitrate solution (252 g/L of $CeO_2$) and 97 g of zirconium oxynitrate solution (261 g/l of $ZrO_2$). The concentration of this solution is 120 g/l of oxide.

373 g of deionized water and 111 g of aqueous ammonia solution (32% $NH_3$) are introduced into a stirred 1.5 liter reactor. The nitrate solution is added over 1 hour. The final pH is in the region of 9.5.

The suspension thus prepared is matured at 95° C. for 2 hours. The medium is then left to cool.

A niobium (V) oxalate solution is prepared by hot dissolution of 44.8 g of niobium (V) oxalate in 130 g of deionized water. This solution is maintained at 50° C. The concentration of this solution is 3.82% $Nb_2O_5$.

The niobium (V) oxalate solution is introduced over 20 minutes into the cooled suspension.

The suspension is filtered and washed. The cake is then placed in an oven and calcined at 800° C. (steady stage of 4 hours).

EXAMPLE 12

This example concerns the preparation of a composition identical to that of Example 11.

A solution of zirconium and cerium IV nitrates is prepared by mixing 451 g of deionized water, 206 g of cerium (IV) nitrate solution (252 g/l of $CeO_2$) and 75 g of zirconium oxynitrate solution (288 g/l of $ZrO_2$). The concentration of this solution is 80 g/l of oxide.

This nitrate solution is placed in an autoclave. The temperature is raised to 100° C. The medium is stirred at 100° C. for 1 hour and is then cooled.

The suspension is transferred into a 1.5 l stirred reactor. A 6 mol/l aqueous ammonia solution is added with stirring until a pH in the region of 9.5 is obtained.

The suspension is matured at 95° C. for 2 hours. The medium is then cooled.

A niobium (V) oxalate solution is prepared by hot dissolution of 39 g of niobium (V) oxalate in 113 g of deionized water. This solution is maintained at 50° C. The concentration of this solution is 3.84% $Nb_2O_5$.

The niobium (V) oxalate solution is added over 20 minutes into the cooled suspension. The pH is then raised to pH 9 by adding an aqueous ammonia solution (32% $NH_3$).

The suspension is filtered and washed. The cake is then placed in an oven and calcined at 800° C. (steady stage of 4 hours).

EXAMPLE 13

This example concerns the preparation of a composition comprising cerium oxide, zirconium oxide and niobium oxide in the following respective mass proportions: 64%-27%-9%.

The process is performed in the same manner as in Example 12. However, the niobium (V) oxalate solution is prepared by hot dissolution of 35.1 g of niobium (V) oxalate in 113 g of deionized water. The concentration of this solution is 3.45% $Nb_2O_5$.

COMPARATIVE EXAMPLE 14A

This example concerns the preparation of a composition comprising cerium oxide, zirconium oxide and niobium oxide in the following respective mass proportions: 19%-78%-3%.

An aqueous ammonia solution D is prepared as in Example 1 and with the same compounds, but in the following proportions:
concentrated aqueous ammonia solution: 940 g
deionized water: 6730 g A solution E is also prepared as in Example 1 and with the same compounds, but in the following proportions:
deionized water: 5710 g
cerium (III) nitrate solution: 2540 g
aqueous hydrogen peroxide solution: 298 g
suspension C: 625 g The process is then performed as in Example 1.

Table 3 below mentions for each of the compositions of the above examples:
the BET specific surface area after calcination for 4 hours at 800° C. and at 900° C.;
the acidity properties;
the reducibility properties.

Acidity

The acidity properties are measured via the TPD method, which is described below.

The probe molecule used for characterizing the acidic sites in TPD is ammonia.

Preparation of the sample:

The sample (100 mg) is brought to 500° C. under a stream of helium (30 ml/minute) at a temperature rise of 20° C./minute and is maintained at this temperature for 30 minutes in order to remove the water vapour and thus prevent blockage of the pores. Finally, the sample is cooled to 100° C. under a stream of helium at a rate of 10° C./minute.

Adsorption:

The sample is then subjected to a stream (30 ml/minute) of ammonia (5 vol % of $NH_3$ in helium) at 100° C. at atmospheric pressure for 30 minutes (to the point of saturation). The sample is subjected for a minimum of 1 hour to a stream of helium (30 ml/minute).

Desorption:

The TPD is conducted by performing a temperature rise of 10° C./minute up to 700° C.

During the temperature rise, the concentration of the desorbed species, i.e. the ammonia, is recorded. The concentration of ammonia during the desorption phase is deduced by means of calibration of the variation in the thermal conductivity of the gas stream measured at the cell outlet by means of a thermal conductivity detector (TCD).

In Table 3, the amounts of ammonia are expressed in ml (standard temperature and pressure conditions)/m² (surface area at 800° C.) of composition. The higher the amount of ammonia, the higher the surface acidity of the product.

Reducibility

The reducibility properties are measured by performing a programmed temperature reduction (TPR) on a Micromeritics Autochem 2 machine. This machine measures the hydrogen consumption of a composition as a function of the temperature.

More specifically, hydrogen is used as reducing gas at 10% by volume in argon at a flow rate of 30 ml/minute. The experimental protocol consists in weighing out 200 mg of the sample in a pretared container. The sample is then introduced into a quartz cell containing quartz wool at the bottom. The sample is finally covered with quartz wool and placed in the oven of the measuring machine. The temperature programme is as follows:

temperature rise from room temperature to 900° C. with an increase ramp of 20° C./minute under $H_2$ at 10 vol % in Ar.

During this programme, the temperature of the sample is measured using a thermocouple placed in the quartz cell above the sample. The hydrogen consumption during the reduction phase is deduced by means of the calibration of the variation in thermal conductivity of the gas stream measured at the cell outlet using a thermal conductivity detector (TCD).

The hydrogen consumption is measured between 30° C. and 900° C. It is given in Table 1 in ml (standard temperature and pressure conditions) of $H_2$ per g of product. The higher this hydrogen consumption, the better the reducibility properties of the product (redox properties).

TABLE 3

| Example No. Ce/Zr/Nb in % | Specific surface area m²/g 800° C. | 900° C. | TPD ml/m² (acidity) | TPR ml $H_2$/g (reducibility) |
|---|---|---|---|---|
| No. 1 64/26/10 | 35 | 17 | $6.5 \times 10^{-2}$ | 32.9 |
| No. 2 55/40/5 | 41 | 19 | $6.4 \times 10^{-2}$ | 29.7 |
| No. 3 54/39/7 | 38 | 16 | $7.3 \times 10^{-2}$ | 29.4 |
| No. 4 78/19/3 | 37 | 12 | $8.7 \times 10^{-2}$ | 30.7 |
| No. 5 77/19/4 | 30 | 14 | $6.9 \times 10^{-2}$ | 29.8 |
| No. 6 79/19/7 | 28 | 15 | $9.4 \times 10^{-2}$ | 32.3 |
| No. 7 72/18/10 | 31 | 17 | $8.3 \times 10^{-2}$ | 32.5 |
| No. 8 69/17/14 | 32 | 12 | $7.8 \times 10^{-2}$ | 33.9 |
| No. 9 97/0/3 | 19 | 15 | $9.1 \times 10^{-2}$ | 19.5 |
| No. 10 91/0/9 | 34 | 15 | $8.9 \times 10^{-2}$ | 21 |
| No. 11 63/27/10 | 36 | 16 | $7.5 \times 10^{-2}$ | 30.4 |
| No. 12 63/27/10 | 47 | 15 | $7 \times 10^{-2}$ | 31.0 |
| No. 13 64/27/9 | 48 | 16 | $7 \times 10^{-2}$ | 31.2 |
| No. 14A Comparative 19/78/3 | 52 | 31 | $7.6 \times 10^{-2}$ | 12.6 |

EXAMPLE 15

This example describes the catalytic properties of the compositions of the preceding examples using SCR catalysis. These properties are evaluated under the following conditions.

In a first series of measurements, the compositions used are those directly from the syntheses described in the preceding examples, i.e. compositions that have been calcined at 800° C. for 4 hours.

In a second series of measurements, the compositions used are those of the preceding examples, but after hydrothermal ageing. This hydrothermal ageing consists in continuously circulating a synthetic gaseous mixture of air containing 10 vol % of $H_2O$ in a reactor containing the composition. During the circulation of the gas, the reactor temperature is maintained at 750° C. for a steady stage of 16 hours.

The compositions are then evaluated in a catalytic test. In this test, a synthetic gaseous mixture (30 L/h) representative of the catalysis process is passed over the composition (90 mg) (Table 4).

TABLE 4

| Composition of a representative mixture | |
|---|---|
| $NH_3$ | 500 vpm |
| NO | 500 vpm |
| $O_2$ | 13 vol % |
| $H_2O$ | 5 vol % |
| $N_2$ | remainder |

The conversion of the NOx is monitored as a function of the temperature of the gaseous mixture.

The results are given as a percentage conversion of the NOx (in this case NO and $NO_2$) in Table 5 below.

TABLE 5

| | Compositions calcined at 800° C./4 hours | | | Compositions after hydrothermal ageing 750° C./16 hours | | |
|---|---|---|---|---|---|---|
| Example No. | 200° C. | 225° C. | 250° C. | 200° C. | 225° C. | 250° C. |
| No. 1 | 25 | 59 | 84 | 23 | 47 | 74 |
| No. 2 | 13 | 28 | 54 | 10 | 26 | 50 |
| No. 3 | 16 | 43 | 71 | 15 | 38 | 60 |
| No. 4 | 10 | 21 | 40 | 7 | 21 | 39 |
| No. 5 | 19 | 43 | 69 | 12 | 35 | 57 |
| No. 6 | 25 | 61 | 81 | 20 | 42 | 68 |
| No. 7 | 30 | 67 | 86 | 22 | 44 | 67 |
| No. 8 | 34 | 67 | 86 | 23 | 47 | 73 |
| No. 9 | 16 | 43 | 76 | 10 | 24 | 54 |
| No. 10 | 20 | 50 | 84 | 13 | 30 | 56 |
| No. 11 | 25 | 52 | 80 | 21 | 44 | 67 |
| No. 12 | 29 | 55 | 80 | 19 | 41 | 65 |

TABLE 5-continued

| | Compositions calcined at 800° C./4 hours | | | Compositions after hydrothermal ageing 750° C./16 hours | | |
|---|---|---|---|---|---|---|
| Example No. | 200° C. | 225° C. | 250° C. | 200° C. | 225° C. | 250° C. |
| No. 13 | 28 | 54 | 80 | 20 | 40 | 63 |
| No. 14A comparative | 7 | 12 | 28 | 4 | 13 | 26 |
| No. 14B comparative $V_2O_5$ (2%)/$TiO_2$ (88%)/$WO_3$ (10%) | 3 | 6 | 9 | 2 | 4 | 8 |
| No. 14C comparative Fe/ZSM5 $Fe_2O_3$ = 1.7% $SiO_2/Al_2O_3$ = 20 | 4 | 3 | 4 | 4 | 4 | 5 |
| No. 14D comparative Cu/Ferrierite CuO (4%) $SiO_2/Al_2O_3$ = 10 | 12 | 19 | 46 | 10 | 15 | 23 |

Example 14B is a comparative example with a composition based on vanadium oxide on a support based on titanium oxide and tungsten oxide. The proportions are on a mass basis.

Example 14C is a comparative example with a zeolite of aluminosilicate type comprising iron. The proportions are on a mass basis.

Example 14D is a comparative example with a zeolite of aluminosilicate type comprising copper. The proportions are on a mass basis.

It appears from Table 5 that the products according to the invention are more efficient than the comparative products, most particularly after ageing.

EXAMPLE 16

This example illustrates the catalytic properties of the compositions according to the invention when they are used in a wash coat on a particle filter or alternatively used in extruded form as described above.

The compositions used are compositions that have undergone the hydrothermal treatment described above.

The compositions according to examples 1, 14C and 14D are mixed in a mortar with a model soot (Carbon Black Cabot Eltex) in a mass proportion of 20% of soot with 80% of composition.

A thermogravimetric analysis (TGA) is performed by circulating a stream of air (1 l/hour) with a temperature rise from room temperature to 900° C. over 20 mg of the mixture prepared previously. The loss of mass of the sample is measured between 250° C. and 900° C. It is considered that the loss of mass in this temperature range corresponds to oxidation of the soot.

Table 6 below gives the results of the analysis, indicating the temperature of initiation of combustion of the soots and the "light-off" temperature (T50%) for which 50% of the soot is oxidized.

TABLE 6

| | T initiation (° C.) | T50% (° C.) |
|---|---|---|
| Without catalyst | 490 | 605 |
| Example No. 1 | 400 | 535 |
| Comparative Example No. 14C | 500 | 611 |
| Comparative Example No. 14D | 500 | 580 |

The product of the invention (Example 1) makes it possible to reduce the initiation temperature by 90° C. and the light-off temperature by 70° C. when compared with a combustion of soot without catalyst.

The products of the comparative examples have no catalytic effect on the oxidation of the soots.

The invention claimed is:

1. A process for treating a gas comprising nitrogen oxides (NOx), the method comprising conducting a reaction for reduction of the NOx with a nitrogenous reducing agent and a catalytic system, wherein the catalytic system comprising a metal oxide composition consisting essentially of cerium oxide and niobium oxide, in the following mass proportions relative to the total mass of the composition:
    niobium oxide from 2% to 20%; and
    the remainder comprising cerium oxide.

2. A process for treating a gas comprising nitrogen oxide (NOx), the method comprising conducting a reaction for reduction of the NOx with a nitrogenous reducing agent and a catalytic system, wherein the catalytic system comprises a metal oxide composition comprising cerium oxide, niobium oxide, and zirconium oxide, in the following mass proportions relative to the total mass of the composition:
    cerium oxide at least 50%;
    niobium oxide from 2% to 20%; and
    zirconium oxide up to 48%.

3. The process as defined by claim 2, wherein the composition further comprises at least one oxide of an element M selected from the group consisting of tungsten, molybdenum, iron, copper, silicon, aluminium, manganese, titanium, vanadium, and a rare-earth metal other than cerium, in the following mass proportions relative to the total mass of the composition:
    cerium oxide: at least 50%;
    niobium oxide: from 2% to 20%;
    oxide of the element M: up to 20%; and
    the remainder comprising zirconium oxide.

4. The process as defined by claim 1, wherein the composition comprises niobium oxide in a mass proportion of is between 3% and 15%.

5. The process as defined by claim 2, wherein the composition comprises cerium oxide in a mass proportion of at least 65% and niobium oxide in a mass proportion of between 2% and 12%.

6. The process as defined by claim 2, wherein the composition comprises cerium oxide in a mass proportion of at least 70%.

7. The process as defined by claim 1, wherein the composition comprises niobium oxide in a mass proportion of less than 10%.

8. The process as defined by claim 2, wherein the composition comprises cerium oxide in a mass proportion of at least 60% and zirconium oxide in a mass proportion of not more than 25%.

9. The process as defined by claim 3, wherein the composition comprises an oxide of at least one metal M' selected from the group consisting of vanadium, copper, manganese, tungsten and iron in a mass proportion of between 1% and 10%.

10. The process as defined by claim 1, wherein the catalytic system comprises a thermally inert material.

11. The process as defined by claim 1, wherein the nitrogenous reducing agent is ammonia or urea.

12. The process as defined by claim 1, wherein the process comprises treating an exhaust gas of a motor vehicle engine.

13. The process as defined by claim 12, wherein the catalytic system is arranged on a particle filter or the composition is in an extruded form.

14. The process as defined by claim 4, wherein the niobium oxide is present in a mass proportion of between 5% and 10%.

15. The process as defined by claim 5, wherein the niobium oxide is present in a mass proportion of between 2% and 10%.

16. The process as defined by claim 6, wherein the cerium oxide is present in a mass proportion of at least 75%.

17. The process as defined by claim 7, wherein the niobium oxide is present in mass proportion of between 2% and 10%.

18. The process as defined by claim 8, wherein the cerium oxide is present in a mass proportion of at least 65% and the zirconium oxide is present in a mass proportion of between 15% and 25%.

19. The process as defined by claim 9, wherein the oxide of at least one metal M' is present in a proportion of between 1% and 3%.

20. The process of claim 10, wherein the thermally inert material is zeolite.

\* \* \* \* \*

UNITED STATES PATENT AND TRADEMARK OFFICE
CERTIFICATE OF CORRECTION

PATENT NO. : 8,734,742 B2
APPLICATION NO. : 13/877154
DATED : May 27, 2014
INVENTOR(S) : Julien Hernandez et al.

Page 1 of 1

It is certified that error appears in the above-identified patent and that said Letters Patent is hereby corrected as shown below:

Title page, item 73 - please include the following under the Assignee name:

"Magnesium Elektron Limited, Salford (UK)"

Signed and Sealed this
Twenty-eighth Day of July, 2015

Michelle K. Lee
*Director of the United States Patent and Trademark Office*